(12) United States Patent
Cao et al.

(10) Patent No.: US 8,402,507 B2
(45) Date of Patent: Mar. 19, 2013

(54) DISTRIBUTING POLICIES TO PROTECT AGAINST VOICE SPAM AND DENIAL-OF-SERVICE

(75) Inventors: Feng Cao, Sunnyvale, CA (US); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1342 days.

(21) Appl. No.: 11/867,656

(22) Filed: Oct. 4, 2007

(65) Prior Publication Data

US 2009/0094666 A1  Apr. 9, 2009

(51) Int. Cl.
 *G06F 17/00* (2006.01)
 *H04L 29/06* (2006.01)
(52) U.S. Cl. ............... 726/1; 726/23; 726/24; 726/25
(58) Field of Classification Search .......... 726/1, 23–25; 706/62
 See application file for complete search history.

(56) References Cited

U.S. PATENT DOCUMENTS

| 7,188,366 | B2 * | 3/2007 | Chen et al. ............... 726/23 |
| 7,331,060 | B1 * | 2/2008 | Ricciulli ................... 726/22 |
| 7,389,537 | B1 * | 6/2008 | Callon et al. .............. 726/22 |
| 7,613,923 | B2 * | 11/2009 | Gilchrist et al. ........... 713/168 |
| 2003/0058839 | A1 * | 3/2003 | D'Souza ................... 370/352 |
| 2004/0120505 | A1 * | 6/2004 | Kotzin et al. ........... 379/373.01 |
| 2004/0225878 | A1 * | 11/2004 | Costa-Requena et al. ... 713/150 |
| 2006/0047960 | A1 * | 3/2006 | Ono et al. ................. 713/171 |
| 2007/0118894 | A1 * | 5/2007 | Bhatia ....................... 726/13 |
| 2007/0124687 | A1 * | 5/2007 | Wing et al. ................ 715/741 |
| 2007/0140157 | A1 * | 6/2007 | Fu et al. ..................... 370/318 |
| 2008/0267144 | A1 * | 10/2008 | Jano et al. ................. 370/338 |
| 2009/0013404 | A1 * | 1/2009 | Chow et al. ................ 726/22 |
| 2009/0022145 | A1 * | 1/2009 | Bakshi et al. ............. 370/352 |

OTHER PUBLICATIONS

Rosenberg et al.; RFC 3261 SIP Session Initiation Protocol; Network Working Group, Copyright 2002; http://www.ietf.org/rfc/rfc3261.txt; pp. 1-210.

* cited by examiner

*Primary Examiner* — Eleni Shiferaw
*Assistant Examiner* — Jing Sims
(74) *Attorney, Agent, or Firm* — Lempia Summerfield Katz LLC

(57) ABSTRACT

In one embodiment, a network device generates a protection policy responsive to identifying undesired voice data traffic. The network device then distributes the generated protection policy along a call path used for transferring the undesired voice data traffic. The proxy may distribute the protection policy by inserting the protection policy in a call response or other message that traces the call path back to a calling endpoint.

21 Claims, 6 Drawing Sheets

```
                                    23A
    ┌─────────────────────────────────────────────────────────────┐
    │ Proxy-Defense: announce=proxy4.aaa.com;                     │
    │         Content-ID="proxy4.aaa.com";                        │
    │ .....                                                       │
    │ Content-Type: application/pkcs7-mime; smime-type=enveloped-data; │
    │ name=smime.p7m                                              │
    │ Content-Transfer-Encoding: binary                           │
    │ Content-ID: proxy4.aaa.com                                  │
    │ Content-Disposition: attachment; filename=smime.p7m; handling=required │
    │ Content-Length: ...                                         │
    └─────────────────────────────────────────────────────────────┘
```

FIG. 2C

```
       99
    ┌──────────────────────────────────┐
    │ <rule>                           │
    │     <duration> 120 </duration>   │
    │     <from> bob@bbb.com </from>   │
    │     <to>   alice@aaa.com </to>   │
    │     <action> block </action>     │
    │ </rule>                          │
    └──────────────────────────────────┘
```

DISTRIBUTING POLICIES TO PROTECT AGAINST VOICE SPAM AND DENIAL-OF-SERVICE

TECHNICAL FIELD

The present disclosure relates generally to the field of networking and multimedia communications.

BACKGROUND

Internet Protocol (IP) telephone devices and other endpoints can use Voice over IP (VoIP) to send and receive voice data over a packet switched network. Sometimes one endpoint is used to send another endpoint malicious voice data communications, which are referred to as Voice Denial-of-Service (VDoS) attacks. These malicious communications are designed to overwhelm processing resources of the target endpoint thereby preventing the target endpoint from processing legitimate voice data communications.

Although endpoint-based solutions have been proposed to identify undesired voice traffic before it is fully processed by the target endpoint, other on-path network devices besides the targeted endpoint may forward the VDoS traffic before the target endpoint or its proxy drops the VDoS traffic. These other on-path network devices consume processing power forwarding the VDoS traffic, which can prevent them from serving legitimate calls. The disclosure that follows solves this and other problems.

BRIEF DESCRIPTION OF THE DRAWINGS

FIG. 2C illustrates example code for implementing the payload announcement header shown in FIG. 2B.

FIG. 2D illustrates an example Extensible Markup Language (XML) tag format usable for implementing a greylist type protection policy.

DESCRIPTION OF EXAMPLE EMBODIMENTS

Overview

Figure 1:
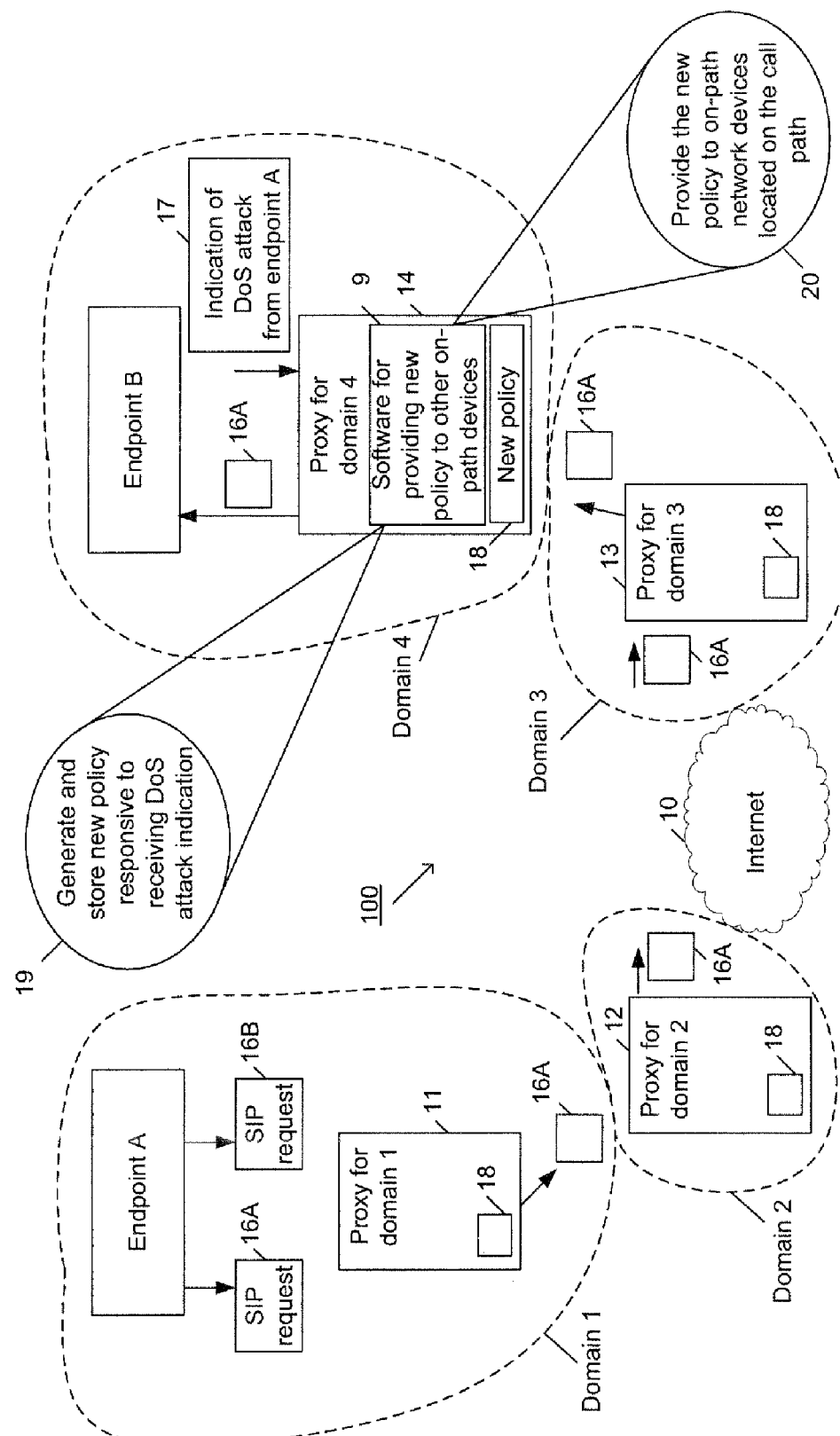
FIG. 1 illustrates an example proxy that distributes a protection policy along a call path for protecting against undesired voice traffic.

In one embodiment, a network device generates a protection policy responsive to identifying undesired voice data traffic. The network device then distributes the generated protection policy along a call path used for transferring the undesired voice data traffic. The proxy may distribute the protection policy by inserting the protection policy in a call response or other message that traces the call path back to a calling endpoint.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device. Only those parts of the various units are shown and described which are necessary to convey an understanding of the examples to those skilled in the art.

FIG. 1 illustrates an example proxy that distributes a protection policy along a call path for protecting against undesired voice traffic.

The system 100 includes an on-path network device, such as proxy 14 located in the domain 4 of the target endpoint B, that generates or identifies a protection policy 18 in response to observing undesired voice traffic addressed to the target endpoint B. The proxy 14 includes software 9 for distributing the new protection policy 18 to preferably as many network devices as possible located on a call path that was used to send the undesired voice traffic to the proxy 14. The distribution of the new protection policy 18 along the call path addresses the system-wide impact of undesired voice data.

To illustrate how the software 9 addresses the system-wide impact of undesired voice traffic, an example is shown where the endpoint A sends a Session Initiation Protocol (SIP) invite 16A to transfer a VDoS attack or other undesired voice traffic to the endpoint B. In the foregoing example, the call establishment protocol used by the endpoint A to send the VDoS attack is SIP; however, it should be apparent that features of the system 100 are also applicable to addressing undesired voice communications transmitted using any protocols for IP Telephony.

In the example, the endpoint A sends the SIP INVITE 16A to initiate the VDoS attack against endpoint B. The SIP INVITE 16A is processed by the proxy 11 before leaving a domain 1. The domain 1 and the proxy 11 may be controlled by an institution such as a business or university; however, for many reasons such institutions may not have adequate information to recognize the SIP INVITE 16A as being associated with a VDoS attack. The SIP INVITE 16A occupies resources of the domain 1 such as routers, switches, proxies and other network devices in the domain 1, which may negatively impact processing of valid VoIP traffic being transferred through the domain 1.

After the SIP INVITE 16A leaves the domain 1, it may enter another domain such as a domain 2 belonging to an Internet Service Provider or other institution that provides Internet access for domain 1. A proxy 12 (as well as other network resources located in that domain 2) processes the SIP INVITE 16A before transfer over the Internet 10. Similar to domain 1, the domain 2 does not recognize the SIP INVITE 16A as being associated with a VDoS attack.

The SIP INVITE 16A progresses through other domains such as any located in Internet cloud 10 and the domain 3 (which may belong to an ISP for the endpoint B) before reaching the domain 4 that includes the target endpoint B. The proxy 14 thereafter learns that endpoint A is using the SIP INVITE 16A to launch a VDoS attack against endpoint B. The proxy 14 may obtain this information in any manner possible, such as by forwarding the SIP INVITE 16A to endpoint B and receiving back an indication 17 that is generated by a user of endpoint B. In other examples where the undesired voice traffic is Spam over IP Telephone (SPIT), the indication 17 may represent a user manually identifying the incoming call as an unsolicited "junk" call.

When the proxy 14 learns of the VDoS attack by observing indication 17, in bubble 19 the proxy 14 generates a new protection policy 18 designed to utilize information about the SIP INVITE 16A to help protect against future VDoS attacks, particularly a future VDoS attack originating from endpoint A and/or domain 1. In the present example, where the undesired voice data is a VDoS attack, the new protection policy 18 may be as simple as a "blacklisting" of endpoint A to prevent endpoint A from sending any communications to endpoint B or any other endpoints located in the domain 4. In other examples where the undesired voice data traffic is not a VDoS attack, the new protection policy 18 may be to impose a daily limit on an amount of incoming calls sent from the calling endpoint A. In other examples, the new protection policy 18 may be to require a calling endpoint A to perform some additional validation such as passing a Turing test.

A notable protection policy 18 requires a network device to drop a message when the message both originates from a domain including the calling endpoint (here domain 1) and is addressed to the domain containing the target endpoint (here domain 4), but is missing a SIP identity for the caller or the calling endpoint A. This protection policy 18 is usable with other protocols besides SIP, such as any protocol that designates an identifier for the calling user or the calling endpoint.

Other protection policies or rules that may be formatted for distribution include greylist policies. A greylist policy is similar to a blacklist policy, except that the identified addresses are prevented from sending traffic to a destination for a finite duration. Any other policy may be formatted including whitelist policies, rate limiting policies, and verification policies. A whitelist policy refers to a policy utilizing a list of addresses that are known to be safe or trusted addresses. A rate limiting policies refers to a policy that limits the amount of traffic sent from a sending address to a destination according to a selected threshold amount. A verification policy refers to a policy that requires an originating node to pass a Turing test or other verification before traffic is transferred to a destination.

After the new protection policy 18 is generated, in bubble 20 the new protection policy 18 is distributed to other network devices located on the call path used to send the SIP INVITE 16A. Preferably, the protection policy 18 is distributed to every hop on the call path for the SIP INVITE 16A.

Such distribution provides the proxies 11-13, located in the other domains 1-3, with the new protection policy 18, which mitigates a subsequent VDoS attack from endpoint A as early as possible. For example, a subsequent SIP INVITE 16B from endpoint A addressed to any endpoints located in domain 4 is dropped by proxy 11 instead of being forwarding through the network only to be eventually dropped by proxy 14. In other words, the dropping by proxy 18 preserves processing resources located in all of the domains 1-4 that would have otherwise been wasted but for the distribution of protection policy 18 by proxy 14.

Figure 2A:
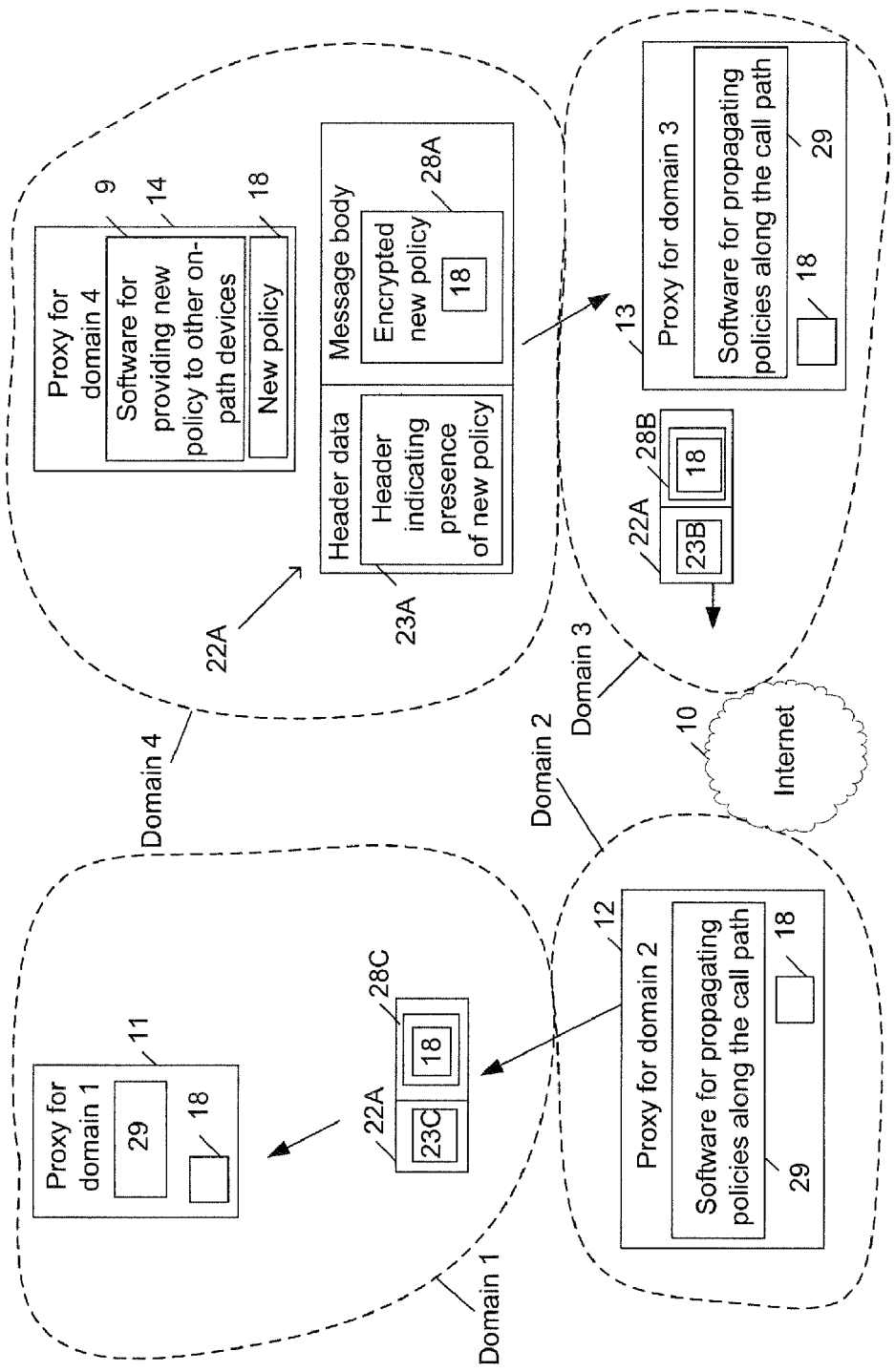
FIG. 2A illustrates one example of how the proxy shown in FIG. 1 distributes the protection policy along the call path.

FIG. 2A illustrates one example of how the proxy shown in FIG. 1 distributes the protection policy along the call path.

Figure 2B:
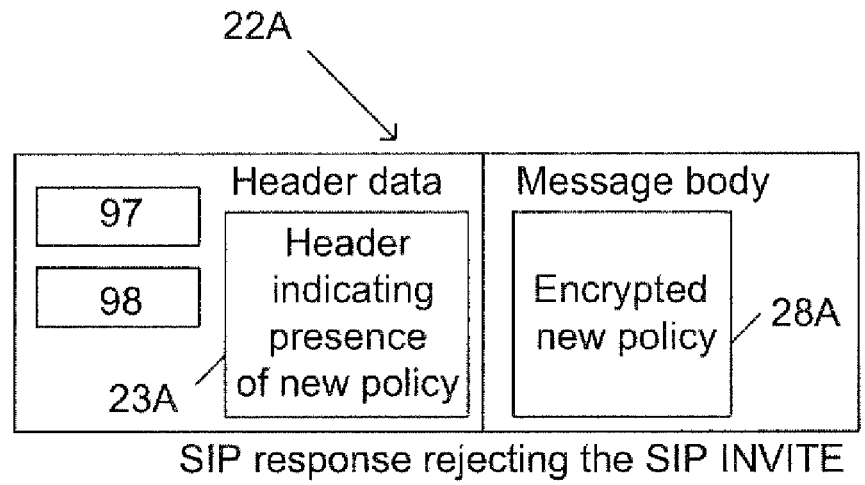
FIG. 2B illustrates an example message used by the proxy shown in FIG. 2A to distribute the protection policy along the call path.
Figure 2B:
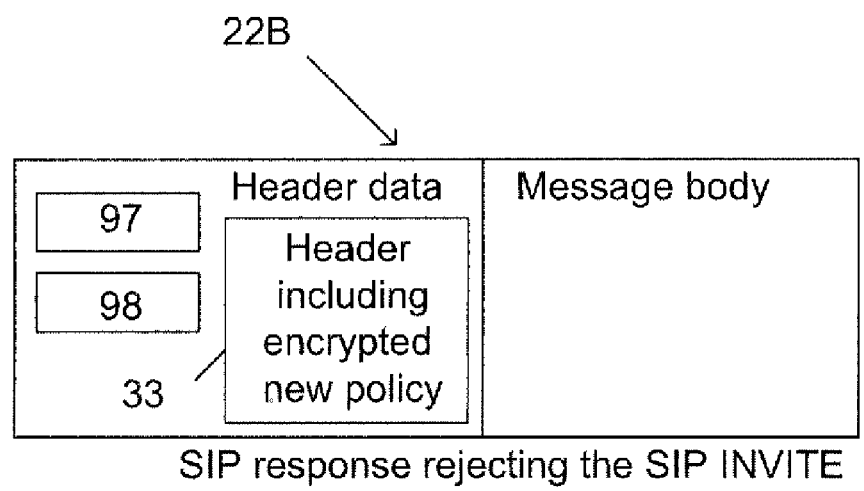
Figure 2B:
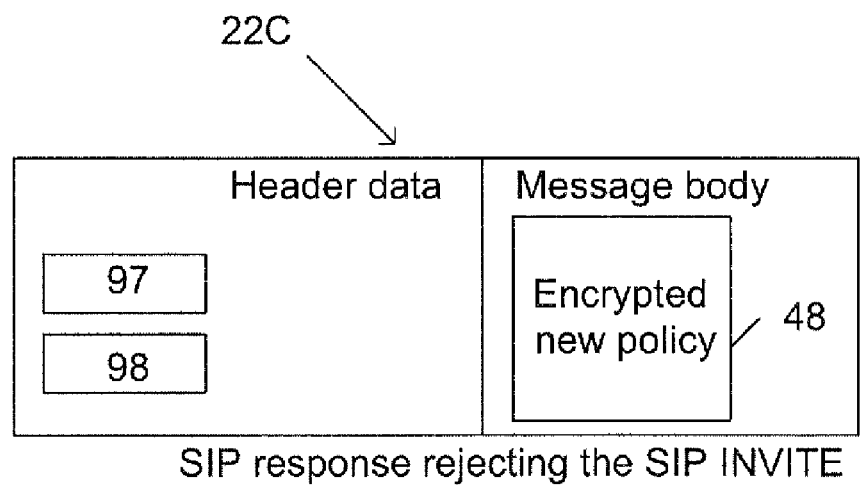

Although the new protection policy 18 may be distributed to network devices located on the call path using any distribution method, a preferred method of distributing the policy 18 through hop-by-hop upstream propagation is provided with reference to FIGS. 2A and 2B. This preferred method of distributing the protection policy 18 leverages certain features of SIP. Namely, this preferred method utilizes a SIP response 22A or other message that is sent from the called endpoint B. Although the foregoing example describes this preferred method in the context of SIP, this preferred method can be used with any type of protocol that defines messages sent over a call path used by the calling endpoint.

A SIP response 22A is sent back from the called endpoint B to reject the SIP INVITE 16A. The various fields and other information normally included in a SIP response are not shown for brevity, but include fields such as a "Via:" field. The "Via:" field identifies the call path and, as the SIP response 22A traces the call path back to the originating endpoint, the network device at each hop removes its identity from the "Via" field.

The software 9 formats the SIP response 22A to include the header 23A indicating the presence of a protection policy within the message body of the SIP response 22A. The message body includes the protection policy 18, but preferably in an encrypted format (encrypted protection policy 28A). It is preferable that the proxy 14 encrypts the policy 18 to be accessed only by the next administrative domain, e.g., proxy 13 located in domain 3. Likewise, the proxy 13 in the next administrative domain generates an encrypted form 28B that can only be accessed by the next administrative domain and so on and so forth. This preferred feature protects the policy 18 from access by the endpoint A thereby minimizing the possibility of endpoint A adapting future attacks to circumvent the new protection policy 18. A non-exhaustive list of protocols that may be used for encryption includes Secure/Multipurpose Internet Mail Extension (S/MIME), Pretty Good Privacy (PGP) and Advanced Encryption Standard (AES).

The software 29 at intermediary proxy 13 is configured to observe the header 23A indicating the presence of a protection policy (rule) in the message body and then decrypt the policy 28A. The proxy 13 may then incorporate the protection policy 18 into its defense policies (such that future messages from endpoint A to endpoint B are blocked) or deny the policy (such that future messages from endpoint A to endpoint B are forwarded normally). Before forwarding the SIP response 22A and applying the policy 18, the proxy 13 may alter or remove the policy 18 based on information about its upstream neighbor. Before forwarding the SIP response 22A along the call path, the proxy 13 is preferably configured to generate encrypted form 28B according to a trust relationship negotiated with its upstream neighbor, proxy 12.

Proxy 12 performs a similar function as proxy 13 until the SIP response 22A having encrypted policy 28C is received by proxy 11. The proxy 11 is preferably configured to remove the policy 18 from the SIP message 22A before forwarding, but may also keep the policy 18 encrypted when forwarding to prevent access by the calling endpoint. Preferably, the policy 18 is distributed to every hop identified in the previously mentioned Via field.

Advantages of the above described distribution method include both interoperability and scaling. With respect to interoperability, the software 9 may insert the intelligent rule without knowledge of whether any or all of the upstream proxies are configured to recognize the header 23A. Such unaware proxies will simply forward the SIP response normally and do not disrupt the ability of a next proxy to recognize and adopt the policy. With respect to scaling, the proxy 14 is not burdened with identifying other network devices along the call path and establishing separate communication sessions with each of those network devices. Moreover, additional traffic overhead is not added because only one message is sent to provide the intelligent rule to other on-path network devices, and that message is already designated to be sent independently of whether any intelligent rules are to be distributed. The intelligent rule may be provided in a SIP response or any other message that traces the call path, such as a SIP BYE message that is sent at the conclusion of the session or a SIP UPDATE.

When a VDoS attack generates a plurality of SIP responses, the proxy 14 preferably correlates the SIP responses by observing a "Contact:" header included in the SIP responses. The proxy 14 then includes the protection policy 18 in only a subset of the correlated SIP responses, which minimizes a processing impact of the intermediary network devices receiving and analyzing the SIP responses. This technique can also be used to minimize the processing impact of including the protection policy 18 in SIP UPDATE messages or BYE messages.

In other embodiments, the functionality performed by the proxy 14 may be performed by other devices including, but not limited to, an Application Layer Gateway (ALG), a H.323 network device or any type of call manager.

FIG. 2B illustrates an example message used by the proxy shown in FIG. 2A to distribute the protection policy along the call path.

In the present embodiment, both the header 23A and the encrypted policy 28A are included in the SIP response 22A. In other embodiments, the encrypted policy may be included entirely in a header 33 of the SIP response 22B, or the encrypted policy 48 may be included entirely in the message body of the SIP response 22C. The header data 23A, 23B and 23C include other fields that may be used when protecting against undesired voice traffic, such as the previously described Via field 97 and Contact header field 98.

FIG. 2C illustrates example code for implementing the payload announcement header shown in FIG. 2B.

The illustrated code included in header 23A is one example of code for announcing the presence of a protection policy located in the message body of a SIP response or other SIP message. Other examples include different payload announcement code or even no payload announcement code as explained previously.

FIG. 2D illustrates an example Extensible Markup Language (XML) tag format usable for implementing a greylist type protection policy.

The example XML tag 99 may be used to present a greylist type protection policy. The example XML tag 90 greylists the endpoint "bob" of the domain "bbb" from sending traffic to the endpoint "alice" of the domain "aaa" for one hundred and twenty minutes. In other words, messages from bob to alice will not be forwarded by any of the hops utilizing the tag 99 during the indicated duration. The greylist protection policy characterized by the XML tag 99 is only one example of a protection policy that may be distributed by the proxy 14.

Figure 3:
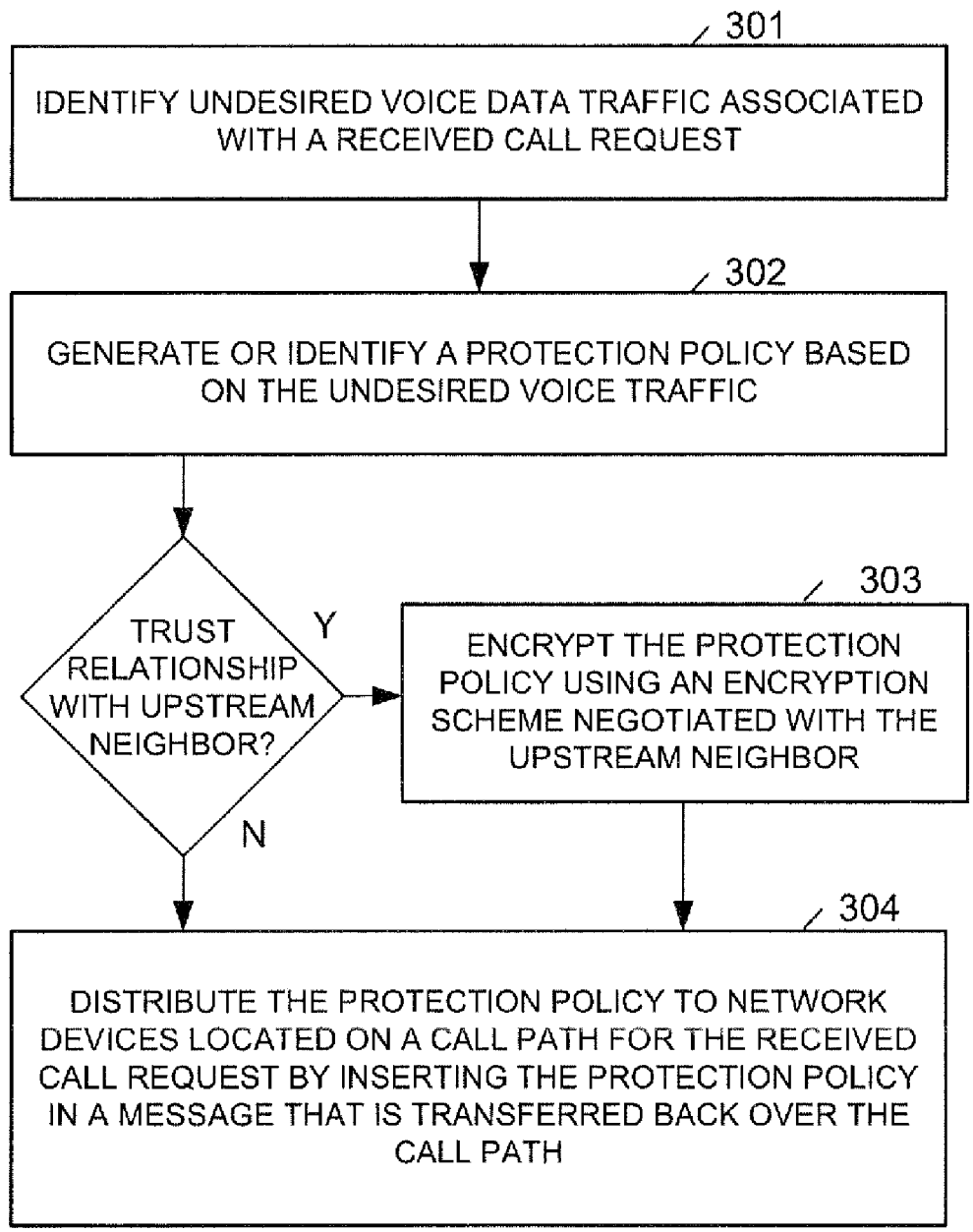
FIG. 3 illustrates an example method for using the proxy illustrated in FIG. 2A.

FIG. 3 illustrates an example method for using the proxy illustrated in FIG. 2A.

In block 301, the proxy 14 identifies undesired voice data traffic associated with a received call request. In block 302, the proxy 14 generates or identifies a protection policy based on the undesired voice data traffic.

When the proxy 14 has a trust relationship established with an upstream neighbor, in block 303 the proxy 14 may encrypt the protection policy using an encryption scheme negotiated with the upstream neighbor. In block 304, the proxy 14 then distributes the protection policy to network devices located on a call path by including the protection policy in a message that is transferred back over the call path.

Figure 4:
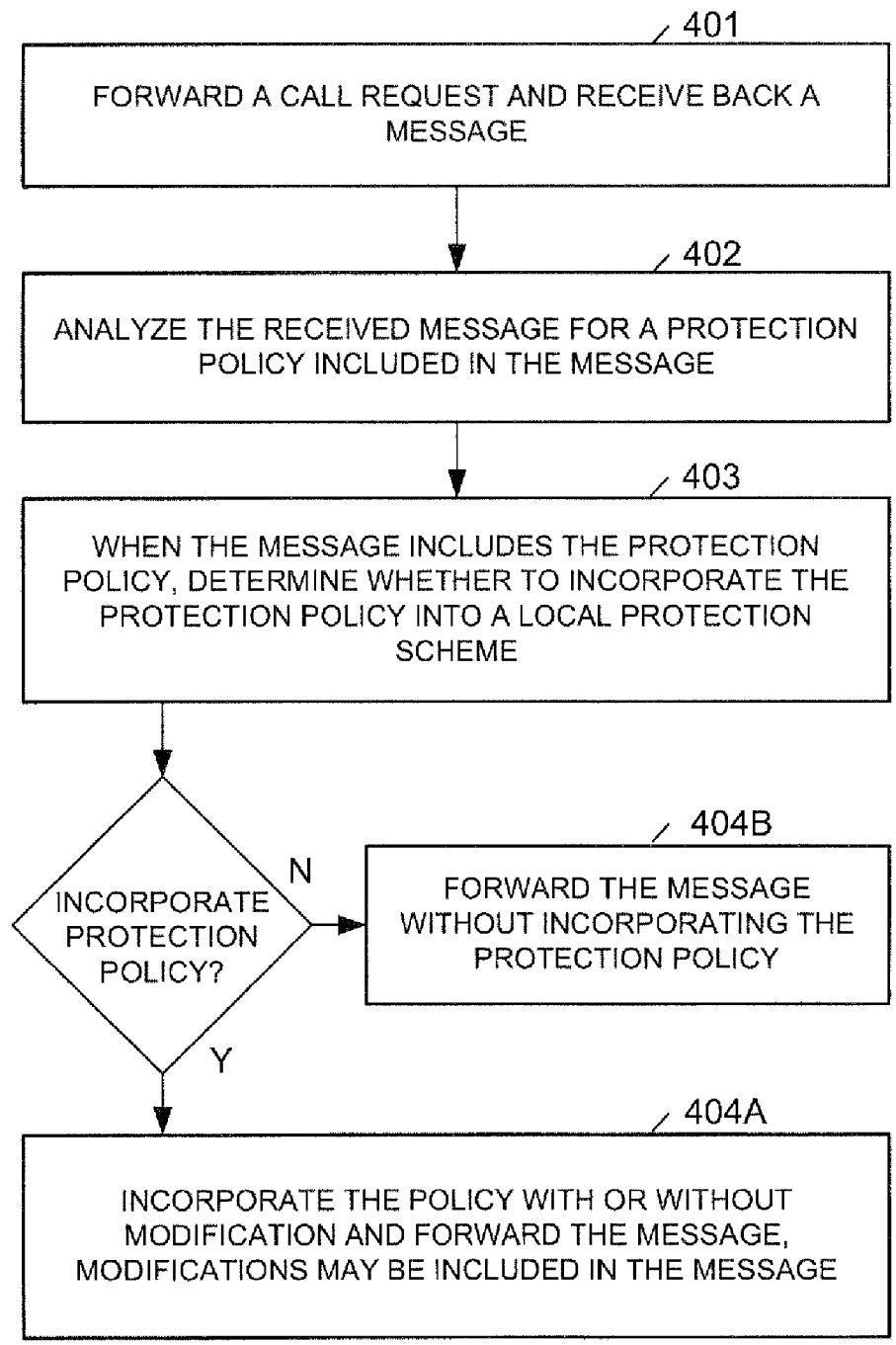
FIG. 4 illustrates an example method for using one of the intermediary proxies illustrated in FIG. 2A.

FIG. 4 illustrates an example method for using one of the intermediary proxies illustrated in FIG. 2A.

In block 401, the intermediary proxy forwards a call request and receives back a message. In decision box 402, the intermediary proxy analyzes the message for a protection policy included in the message.

When the message includes the protection policy, in block 403 the intermediary proxy determines whether to incorporate the protection policy into a local protection scheme. When the protection policy is incorporated, in block 404A the intermediary proxy incorporates the policy either with or without modification and may forward the message. Otherwise, the intermediary proxy may forward the message without incorporating the modifications in block 404B. Optionally, the intermediary proxy may re-encrypt the protection policy included in the message using an encryption scheme that is negotiated with an upstream neighbor located on the call path.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus comprising:
    one or more processors; and
    a memory coupled to the processors comprising instructions executable by the processors, the processors operable when executing the instructions to:
    generate a protection policy responsive to identifying undesired voice data traffic that is transferred using an internet telephony protocol, the protection policy generated according to the undesired voice data traffic;

identify a message type that is designated under the internet telephony protocol for transmission along a call path used for transferring the undesired voice data traffic to the apparatus; and distribute the generated protection policy along the call path by inserting the generated protection policy in a message of the identified message type.

2. The apparatus of claim 1 wherein the protection policy is provided to at least one remote network device located on the call path, the at least one remote network device located in a different domain than the apparatus.

3. The apparatus of claim 1 wherein the processors are further operable to:

generate instructions requesting any communication addressed to a first domain that includes a target endpoint to be dropped when the communication is both missing an identity and originating from a domain associated with an originator of the undesired voice data traffic; and include the generated instructions within the protection policy.

4. The apparatus of claim 1 wherein the processors are further operable to:

correlate a plurality of Session Initiation Protocol (SIP) responses elicited by a plurality of randomly generated port numbers by observing a common Contact: header included in the SIP responses; and include the protection policy in a subset of the correlated SIP responses.

5. The apparatus of claim 1 wherein the processors are further operable to:

include the protection policy in a message to be sent to network devices located along the call path, the network devices including an originating endpoint of the undesired voice data traffic; and encrypt the protection policy before transferring the message to prevent the originating endpoint from accessing the protection policy.

6. The apparatus of claim 1 wherein the apparatus comprises a SIP proxy, a call manager, an Application Layer Gateway (ALG), or operates according to the H.323 protocol.

7. The apparatus of claim 1, wherein the inserted protection policy is configured to, if executed by a remote network device, cause the remote device to initiate voice traffic filtering responsive to executing the protection policy and according to the protection policy.

8. A method comprising:

forwarding an initial call invite message according to an internet telephony protocol;

receiving a first communication associated with the initial call invite message, the first communication designated under the internet telephony protocol for transmission along a call path used for the initial call invite message;

identifying a protection policy located in the first communication, the protection policy comprising a command to drop or forward traffic according to a condition indicated by the protection policy;

receiving a second communication subsequent to receiving the first communication; and determining whether the condition indicated by the protection policy is met responsive to said receiving of the second communication, and dropping or forwarding the subsequently-received second communication according to a result of the determination;

wherein the first communication is a Session Initiation Protocol (SIP) response that includes a Via field identifying network devices located on the call path and the method further comprises providing the protection policy to each network device identified in the Via field.

9. The method of claim 8 further comprising:

generating the protection policy responsive to identifying undesired voice data traffic, the protection policy generated according to the undesired voice data traffic; and including the generated protection policy in the first communication for distribution to at least one remote network device located on the call path.

10. The method of claim 8 wherein the protection policy requests dropping SIP invites addressed to a target domain of the initial call invite message when those SIP invites are both missing a SIP identity and originating from a calling domain associated with the initial call invite message.

11. The method of claim 8 further comprising:

removing a first encryption scheme from the protection policy included in the first communication;

determining a second encryption scheme used by a remote upstream neighbor that is indicated in a Via field of the first communication; and encrypting the protection policy using the second encryption scheme before forwarding the first communication to the remote upstream neighbor.

12. The method of claim 8 further comprising:

correlating a plurality of SIP responses elicited by a plurality of randomly generated port numbers by observing a common SIP Contact: header included in the SIP responses; and including the protection policy in only a subset of the correlated SIP responses.

13. An apparatus, comprising:

a processing device; and a memory coupled to the processing device comprising instructions executable by the processing device, the processing device operable when executing the instructions to:

identify a rule for controlling whether traffic is dropped or forwarded, the rule being identified responsive to observing undesired voice data;

in order to distribute the rule to one or more remote network devices located on a transmit call path used for transferring the undesired voice data from an originating endpoint to a destination endpoint, insert the identified rule into a call response that is configured to trace, in reverse, the transmit call path of the undesired voice data; and cause the call response having the inserted rule to be transmitted along the transmit call path.

14. The apparatus of claim 13, wherein the processing device is further operable to distribute the rule to network devices listed in a Via header of a received Session Initiation Protocol (SIP) call invite.

15. The apparatus of claim 13, wherein the rule is distributed by insertion into an endpoint-generated communication that is designated to be sent regardless of whether any rules are to be distributed.

16. The apparatus of claim 15, wherein the endpoint-generated communication is a SIP response, SIP update message or SIP bye message.

17. The apparatus of claim 13, wherein the processing device is further operable to:

analyze a communication received at one of the remote network devices to determine whether the communication includes the rule;

incorporate the rule in a local defense scheme; and determine whether to drop or forward other subsequently received communications according to the rule.

18. The apparatus of claim 13, wherein the processing device is further operable to apply the rule to communications received by at least one of the remote network devices.

19. The apparatus of claim 13, wherein the rule is distributed by a SIP proxy, a call manager, an Application Layer Gateway (ALG), or an H.323 network device.

20. The apparatus of claim 13, wherein the rule is a blacklist policy, a greylist policy, a whitelist policy, a rate limiting policy, or a verification policy.

21. The apparatus of claim 13, wherein the inserted rule is configured to, if executed by a remote network device of the at least one remote network devices, cause the executing remote network device to initiate voice traffic filtering responsive to executing the inserted rule and according to the inserted rule.

\* \* \* \* \*